United States Patent
Watanabe

[11] Patent Number: 6,114,824
[45] Date of Patent: Sep. 5, 2000

[54] CALIBRATION METHOD FOR A VISUAL SENSOR

[75] Inventor: Atsushi Watanabe, Oshino-mura, Japan

[73] Assignee: Fanuc Ltd., Minamitsuru, Japan

[21] Appl. No.: 07/838,812

[22] PCT Filed: Jul. 18, 1991

[86] PCT No.: PCT/JP91/00960

§ 371 Date: Mar. 19, 1992

§ 102(e) Date: Mar. 31, 1999

[87] PCT Pub. No.: WO92/01539

PCT Pub. Date: Feb. 6, 1992

[30] Foreign Application Priority Data

Jul. 19, 1990 [JP] Japan ................................ 2-190958

[51] Int. Cl.[7] ............................ G05B 19/403; B25J 9/16; G06F 15/62

[52] U.S. Cl. .................... 318/568.12; 318/573; 318/578; 414/730; 901/47; 29/407.04

[58] Field of Search ................... 318/560–630, 318/640; 395/80–89; 901/3, 5, 7, 9, 15, 20, 47, 50, 2; 219/121.63

[56] References Cited

U.S. PATENT DOCUMENTS

| | | | |
|---|---|---|---|
| 3,890,552 | 6/1975 | Devol et al. | 318/574 X |
| 4,146,924 | 3/1979 | Birk et al. | 318/640 |
| 4,441,817 | 4/1984 | Pryor | 901/47 |
| 4,481,592 | 11/1984 | Jacobs et al. | 318/573 X |
| 4,639,878 | 1/1987 | Day et al. | 901/47 |
| 4,712,183 | 12/1987 | Shiroshita et al. | 901/3 |
| 4,753,569 | 6/1988 | Pryor . | |
| 4,796,200 | 1/1989 | Pryor . | |
| 4,851,905 | 7/1989 | Pryor . | |
| 4,853,771 | 8/1989 | Witriol et al. | 901/46 |
| 4,954,762 | 9/1990 | Miyake et al. | 318/568.19 |
| 4,979,135 | 12/1990 | Moy | 901/47 |
| 4,983,797 | 1/1991 | McAllister et al. | 901/42 |
| 5,020,001 | 5/1991 | Yamamoto et al. | 901/2 |
| 5,023,426 | 6/1991 | Prokosch et al. | 219/121.63 |
| 5,034,904 | 7/1991 | Moy | 364/571.04 |
| 5,041,991 | 8/1991 | Fujiki . | |
| 5,083,073 | 1/1992 | Kato | 318/577 |
| 5,086,262 | 2/1992 | Hariki et al. | 318/568.1 |
| 5,148,591 | 9/1992 | Pryor | 29/407 |

FOREIGN PATENT DOCUMENTS

| | | |
|---|---|---|
| 0 151 417 | 8/1985 | European Pat. Off. . |
| 59-227382 | 12/1984 | Japan . |
| 60-37007 | 2/1985 | Japan . |
| 62-102984 | 5/1987 | Japan . |

Primary Examiner—Paul Ip
Attorney, Agent, or Firm—Staas & Halsey

[57] ABSTRACT

A calibration method enables a visual sensor attached to a robot to be calibrated easily, quickly, and accurately without using a mechanism for accurately setting a calibration jig or a wide jig setting space. First calibration pattern data, which includes the coordinate values of dots composing a dot pattern formed on a pattern plate (3) mounted on the distal end of an arm of a first robot (1), in a common coordinate system is entered in a visual sensor control device (20) by means of a first robot control device (10), and pattern plate image data is delivered from a camera (6), which is mounted on the distal end of an arm of a second robot (4), to the visual sensor control device (20). Then, the first calibration pattern data (12a) is compared with second calibration pattern data (25a) which includes the coordinate values of the dots composing a dot pattern, calculated on the basis of video data, in a camera coordinate system, and calibration data (CD) for associating the common coordinate system with the camera coordinate system is obtained to calibrate the camera.

8 Claims, 4 Drawing Sheets

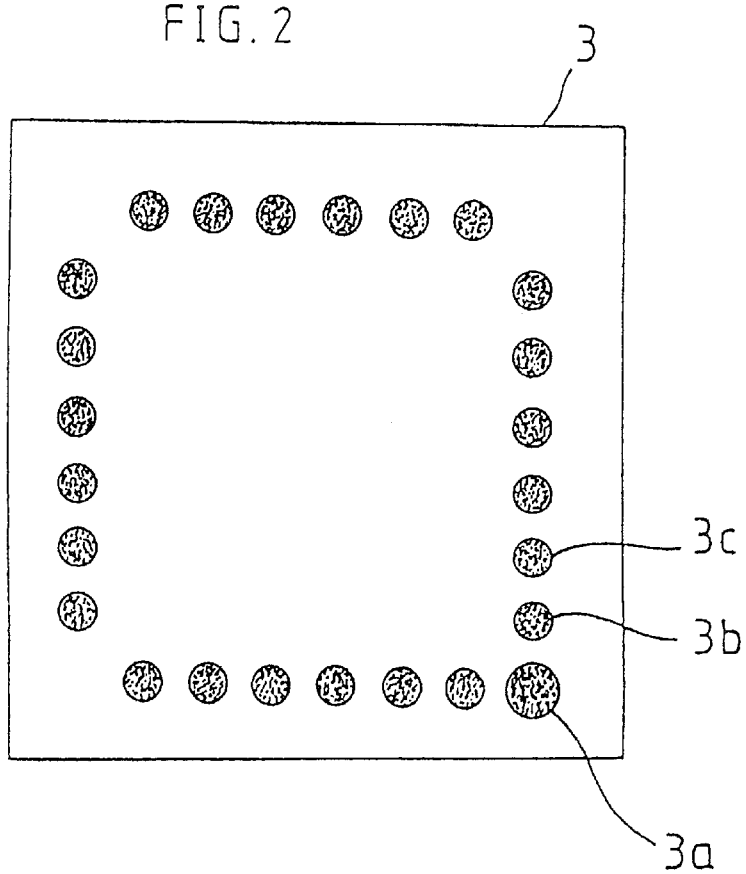
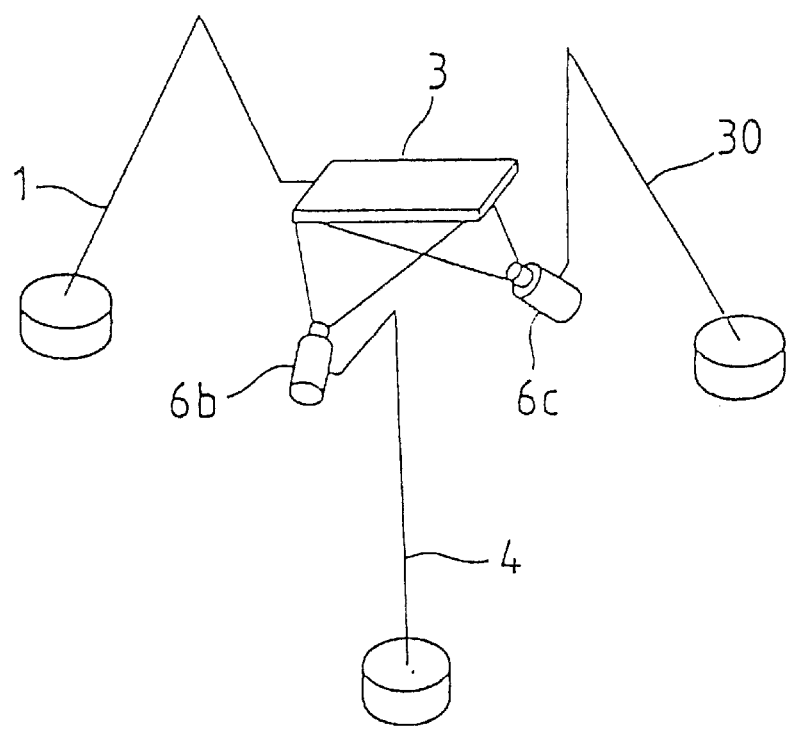

CALIBRATION METHOD FOR A VISUAL SENSOR

BACKGROUND OF THE INVENTION

1. Field of the Invention

The present invention relates to a calibration method for a visual sensor, and more particularly, to a method for calibrating a visual sensor attached to a robot by means of a calibration jig which is movably supported by means of another robot.

2. Description of the Related Art

Conventionally known are robot systems which perform assembly operation, palletizing operation, etc. for workpieces on a working line by utilizing visual information from one or more visual sensors. Also known is a technique for movably holding a visual sensor by means of a robot arm to cope with the variation of the workpiece position. According to the robot systems of this type, the visual sensor is calibrated to make sensor coordinate values to correspond to robot coordinate values before robot operation, in order to make the visual information available for the robot operation. Conventionally, for example, a camera (visual sensor in general) mounted on the robot arm is calibrated by using an exclusive-use calibration jig which is set within the range of the camera.

Generally, however, the conventional calibration jig is large-sized, and therefore, requires a wide setting space. This requirement is particularly awkward when the calibration jig is set on the working line. Further, accurately setting the conventional calibration jig takes time, so that a special jig setting mechanism must be provided for accurately setting the calibration jig.

SUMMARY OF THE INVENTION

The object of the present invention is to provide a calibration method in which a visual sensor attached to a robot can be calibrated easily, quickly, and accurately without using a mechanism for accurately setting a jig or a wide jig setting space.

In order to achieve the above object, according to the present invention, (a) first calibration pattern data including the coordinate values of a calibration jig, movably supported by means of a robot and formed of a pattern member, on a common coordinate system is generated; (b) second calibration pattern data including the coordinate values of the calibration jig on a visual sensor coordinate system is generated in accordance with visual information data for the calibration jig obtained by means of a visual sensor mounted on another robot; and (c) the visual sensor is calibrated on the basis of the first and second calibration pattern data.

According to the present invention, as described above, the visual sensor can be calibrated by using the calibration jig mounted on one robot and the visual sensor mounted on the other robot. The calibration jig, which is formed of the pattern member, is smaller in size and simpler in construction than a conventional jig, and is movably held by means of the robot, so that the jig can be located easily, quickly, and accurately in a desired position without requiring a wide jig setting space. Also, the visual sensor can be calibrated easily, quickly, and accurately on the basis of the first calibration pattern data including the coordinate values of the calibration jig on the common coordinate system and the second calibration pattern data generated in accordance with the visual information data for the calibration jig obtained by means of the visual sensor and including the coordinate values of the calibration jig on the visual sensor coordinate system. Thus, there is no need of any special mechanism for accurately positioning the calibration jig.

BRIEF DESCRIPTION OF THE DRAWINGS

FIG. 2 is an enlarged plan view showing a pattern plate of FIG. 1 in detail;

FIG. 4 is a partial schematic view showing a modification of the robot system of FIG. 1;

DESCRIPTION OF THE PREFERRED EMBODIMENT

Figure 1:
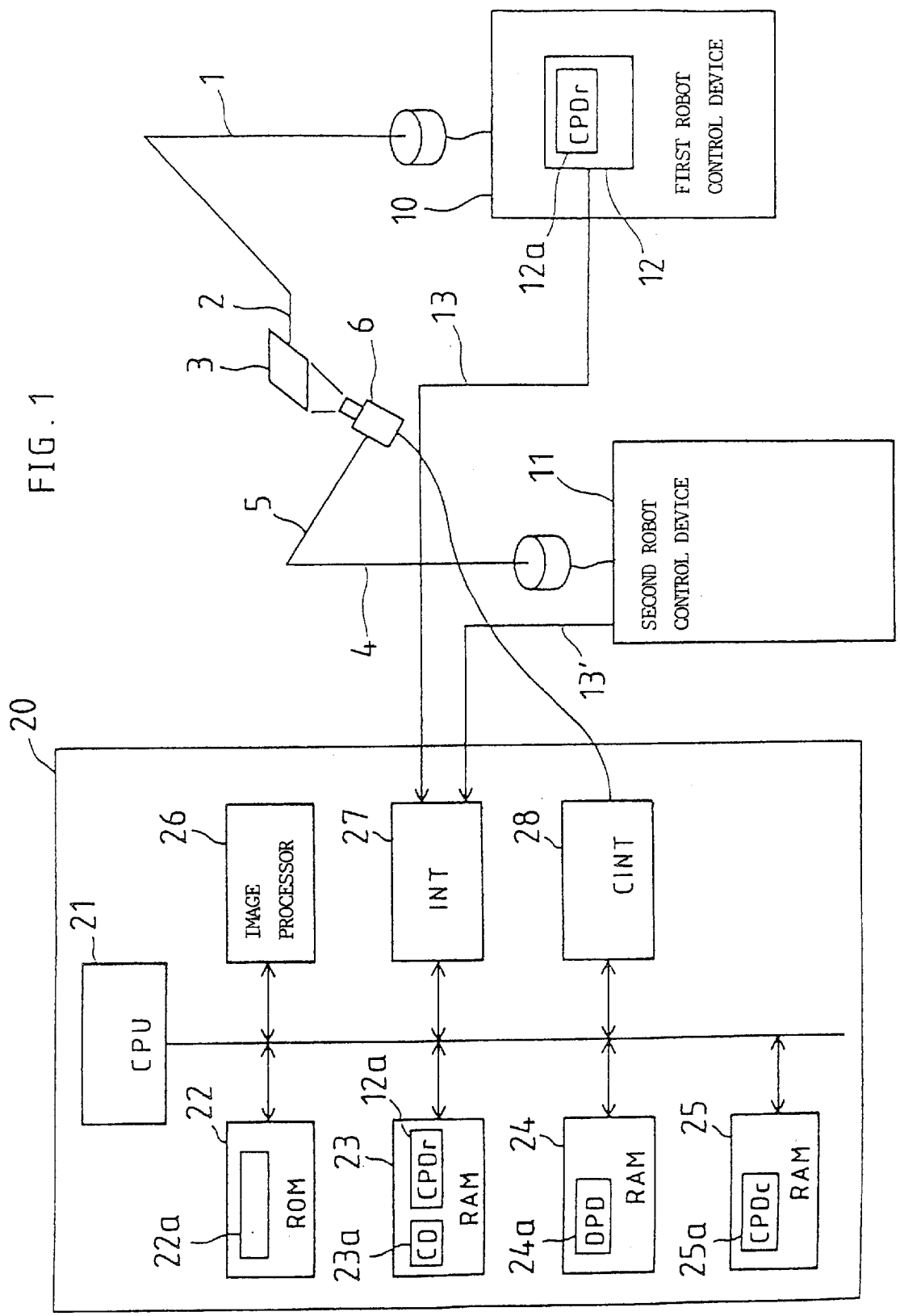
FIG. 1 is a schematic view showing a robot system for carrying out a calibration method for a visual sensor according to one embodiment of the present invention.

Referring to FIG. 1, a robot system according to one embodiment of the present invention comprises first and second robots 1 and 4 and first and second robot control devices 10 and 11 for driving the robots 1 and 4, respectively. Both the robots 1 and 4 are arranged with known attitudes in known positions on a common coordinate system (not shown) set in a robot system space.

The first robot 1 is formed of, for example, a multi-joint robot having an arm 2 which is composed of a plurality of links adjacently connected to one another by means of joints. A pattern plate 3, for use as a calibration jig, mounted on the arm's distal end (tool center point (TCP)) is located with a desired attitude in a desired position on a first robot coordinate system (or common coordinate system, not shown) for the first robot 1. The pattern plate 3, which is simple in construction and small-sized, can be easily manufactured and mounted on the robot 1. The pattern plate 3 of only one type is required for the calibration. As shown in FIG. 2, the pattern plate 3 is formed with a rectangular dot pattern composed of, e.g., 25 dots 3a, 3b, 3c, . . . arranged along the four sides thereof, and the dot 3a for the origin is larger in diameter than the other dots 3b, 3c, . . . . Theoretically, only six dots are enough for the dot pattern to be used for the calibration. In the present embodiment, however, the dot number is increased for more accurate calibration.

The second robot 4, like the first robot 1, is formed of, for example, a multi-joint robot, in which a camera 6 (visual sensor in general), fixed to the distal end of an arm 5 or mounted on the arm's distal end for rotation with respect to the arm axis and an axis perpendicular to the arm axis, is located with a desired attitude in a desired position on a second robot coordinate system or common coordinate system (not shown) for the second robot 4. Further, the camera 6 is provided with a camera coordinate system (visual sensor coordinate system in general, not shown) for specifying the position of an image point on the camera screen.

Each of the first and second robot control devices 10 and 11 has a function to detect the current coordinate values (position and attitude) of the arm's distal end of the first or second robot corresponding thereto on the first or second robot coordinate system corresponding thereto, on the basis of the joint angle, and a function for coordinate transform from the common coordinate values to the robot coordinate values and coordinate transform from the robot coordinate values to the common coordinate values, and can drive the robot on the common coordinate system. Further, the first robot control device 10 calculates first calibration pattern data (CPDr) 12a, which is indicative of the coordinate values of the dot pattern element dots 3a, 3b, 3c, . . . on the common coordinate system, on the basis of the coordinate values of the arm's distal end, the known mounting position and attitude of the pattern plate 3 with respect to the first robot 1, and the respective known formation positions of the dots 3a, 3b, 3c, . . . on the pattern plate 3, and loads the calculated data into a built-in memory 12 thereof.

Furthermore, the robot system comprises a visual sensor control device 20 for calibrating the camera 6 on the basis of the first calibration pattern data 12a and video data (visual information data in general) from the camera 6. The control device 20 comprises a processor (CPU) 21, a read-only memory (ROM) 22 loaded with a control program 22a for calibrating operation, and first to third random access memories (RAMs) 23 to 25. Also, the visual sensor control device 20 comprises an image processor 26, an interface 27 connected to the first and second robot control devices 10 and 11 by means of communication lines 13 and 13', respectively, and a camera interface 28 connected to the camera 6. The elements 22 to 28 are connected to the processor 21 by means of buses. The robot system is provided as required with a keyboard (not shown) which is connected to the visual sensor control device 20 through a keyboard interface (not shown).

The following is a description of the calibrating operation of the robot system of FIG. 1.

Before starting the operation of the robot system, an operator enters dot pattern data (DPD) 24a, indicative of the respective formation positions of the individual dot pattern element dots 3a, 3b, 3c, . . . on the pattern plate 3, in the visual sensor control device 20 by means of the keyboard. Alternatively, the data 24a may be previously described in the control program 22a. In response to the data entry through the keyboard or data reading from the control program, the pattern data 24a is loaded into the RAM 24 under the control of the processor 21.

When the calibrating operation is started under the control of the processor 21 which operates in accordance with the control program in the ROM 22, the first robot 1 is first driven by the first robot control device 10, and the pattern plate 3 mounted on the distal end of the arm 2 is located in a desired position, e.g., a predetermined position on a working line. The first robot control device 10 detects the coordinate values of the arm's distal end of the first robot 1 on the first robot coordinate system, and obtains the respective coordinate values of the individual dot pattern element dots 3a, 3b, 3c, . . . on the first robot coordinate system, on the basis of the detected coordinate values, the known mounting position and attitude of the pattern plate 3 with respect to the first robot 1, and the known dot pattern formation position on the pattern plate 3. Subsequently, the first robot control device 10 obtains the first calibration pattern data (CPDr) 12a by transforming the coordinate values on the first robot coordinate system for each dot into coordinate values on the common coordinate system, and loads the data 12a into the memory 12. The first calibration pattern data 12a is transferred from the memory 12 to the RAM 23 via the communication line 13 and the interface 27, to be loaded into the RAM 23, under the control of the processor 21.

Then, the second robot 4 is driven by means of the second robot control device 11, by positioning the camera 6 mounted on the distal end of the arm 5 so that the pattern plate 3 comes within the range of the camera 6. The camera 6 picks up an image of the dot pattern of the pattern plate 3, and delivers dot pattern video data. The dot pattern video data is transferred to the RAM 25 via the camera interface 28, to be loaded into the RAM 25, under the control of the processor 21. The image processor 26 reads out the dot pattern data (DPD) 24a from the RAM 24, and also fetches the dot pattern video data. Based on the data 24a and the video data, the image processor 26 calculates second calibration pattern data (CPDc) 25a, which is indicative of the coordinate values of the individual dot pattern element dots on the camera coordinate system and loads the calculated data 25a into the RAM 25.

The processor 21 reads out the first and second calibration pattern data 12a and 25a from the RAMs 23 and 25, respectively, compares the two pattern data 12a and 25a, and calculates calibration data (CD) 23a, which includes camera parameters (e.g., directional cosines of the camera axis with respect to the individual coordinate axis directions of the common coordinate system) and associate the common coordinate system with the camera coordinate system so that the common coordinate values and the camera coordinate values evenly correspond to one another. For example, the processor 21 obtains the camera parameters by solving simultaneous equations containing the first and second calibration pattern data 12a and 25a obtained in the aforesaid manner and unknown camera parameters as variables. Then, the calibration data 23a is loaded into the RAM 23, whereupon the calibration of the camera 6 is finished.

In operating the robots for a workpiece, the pattern plate 3 is retreated from the working line or removed from the first robot 1, if necessary, and the workpiece (not shown) is then transported to a predetermined position on the working line. The workpiece (not shown) is photographed by means of the camera 6 mounted on the second robot 4, and coordinate value data of the workpiece on the common coordinate system is obtained by means of the processor 21, on the basis of the resulting workpiece video data and the calibration data 23a read out from the RAM 23. Thereafter, the workpiece coordinate value data is delivered to the first robot control device 10 in order to cause the first robot 1, cleared of the pattern plate 3, to perform robot operation, for example, and the robot operation is started under the control of the first robot control device 10. Alternatively, the robot operation may be executed by means of a third robot (not shown) which is arranged on the common coordinate system.

Figure 3:
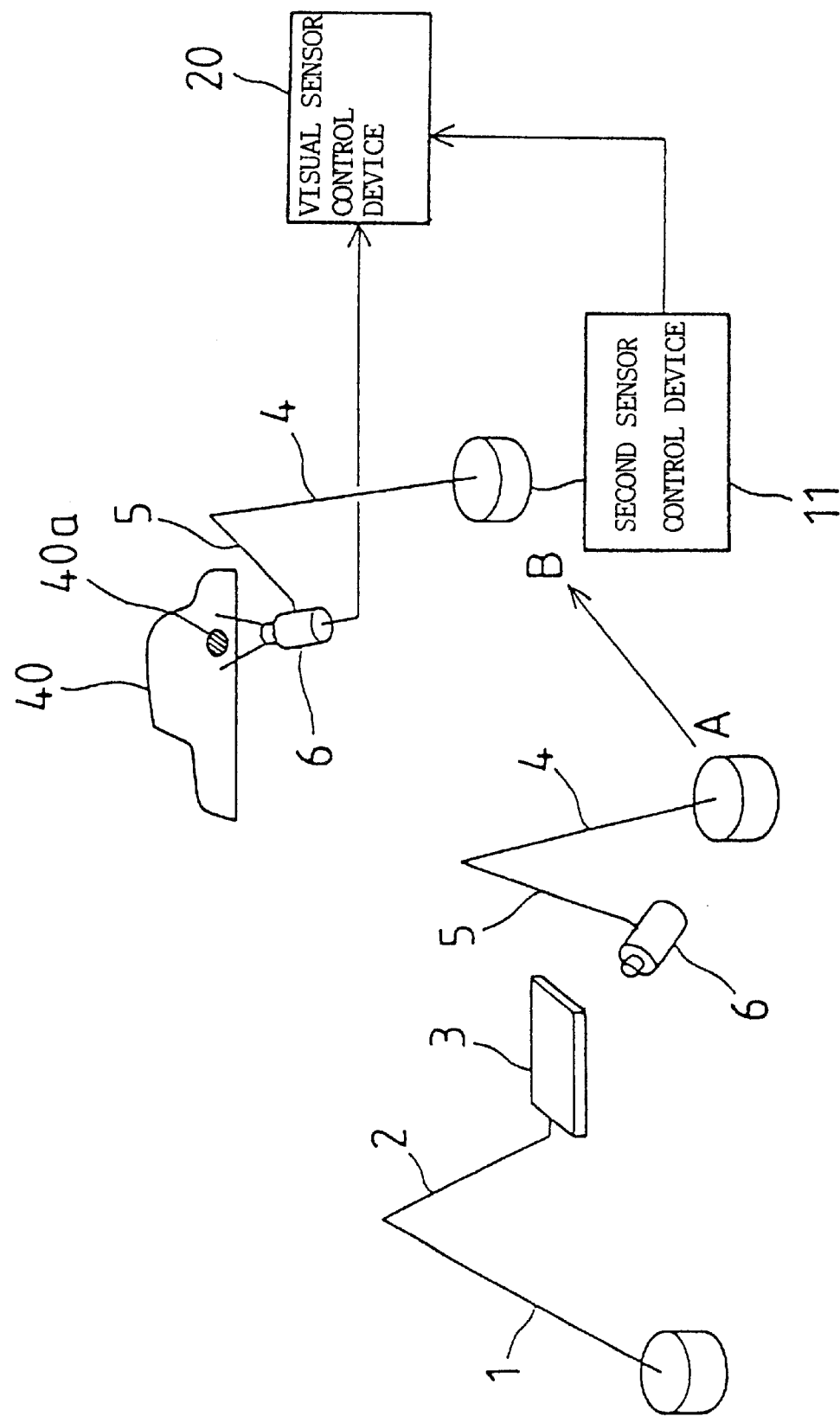
FIG. 3 is a schematic view showing a case in which a robot mounted with a camera is moved toward a workpiece after calibration is finished.

Unlike the aforesaid case in which the second robot 4 is located in the same position before and after the calibration, the second robot 4 with the camera 6 mounted thereon may be moved from the position for the calibration designated by symbol A in FIG. 3 to another position B without making any substantial calibration again. More specifically, in this case, the movement of the second robot 4 from the position A to the position B on the common coordinate system is calculated by means of the second robot control device 11, and the calculated movement is loaded into a built-in memory (not shown) of the device 11. Then, video data obtained by photographing a specific point 40a of the workpiece 40 by means of the camera 6 is delivered from the camera 6 to the visual sensor control device 20, and coordinate value data of the specific point 40a on the common coordinate system is calculated by means of the visual sensor control device 20, on the basis of the movement data, the video data, and the calibration data 23a obtained before the movement of the second robot 4. The calculated coordinate value data is used for robot operation control thereafter. In other words, the calibration data 23a is corrected depending on the movement of the second robot 4.

Also, as described above, even when the second robot 4 with the camera 6 mounted thereon is moved after the calibration, the calibration need not be repeated. Thus, the workpiece on the working line can be photographed without hindrance, even when the camera 6 is moved to a position facing the working line after the calibration is carried out in a position off the working line.

The present invention is not limited to the embodiment described above, and various modifications may be effected therein.

In connection with the above embodiment, for example, the calibration of the camera 6 mounted on the second robot 4 has been described; alternatively, however, the camera 6 and the pattern plate 3 may be mounted on the first and second robots 1 and 4, respectively so that the camera on the first robot can be calibrated. Thus, according to the present invention, a camera can be calibrated, in a robot system which includes a pair of robots, in a manner such that a desired one robot mounted with the camera and the other robot fitted with a pattern plate cooperate with each other.

Figure 5:
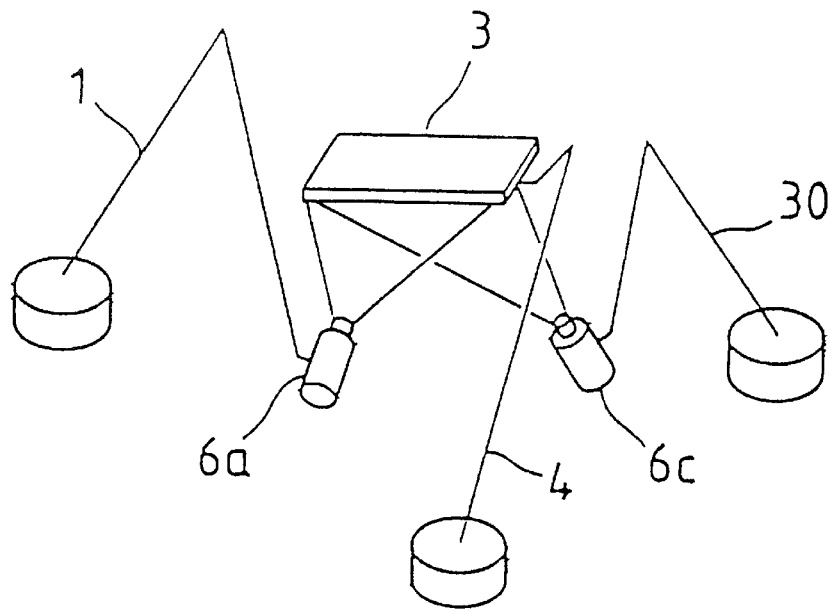
FIG. 5 is a partial schematic view showing another modification of the robot system.
Figure 6:
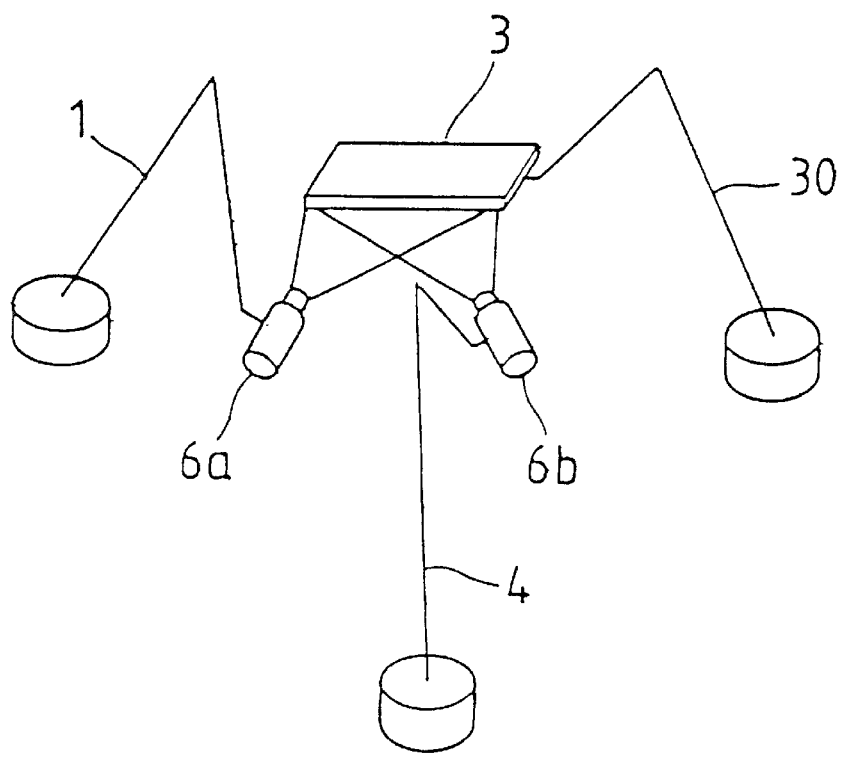
FIG. 6 is a partial schematic view showing still another modification of the robot system.

Further, the present invention is not limited to the robot system comprising the two robots but may also be applied to a robot system comprising three or more robots. In this case, a pattern plate 3 is mounted on a desired one robot of the robot system, and cameras are mounted individually on other robots. As shown in FIG. 4, for example, the pattern plate 3 is mounted on a first robot 1, and cameras 6b and 6c are mounted on second and third robots 4 and 30, respectively. FIG. 5 shows a case in which the pattern plate 3 is mounted on the second robot 4, and cameras 6a and 6c are mounted on the first and third robots 1 and 30, respectively. FIG. 6 shows a case in which the pattern plate 3 is mounted on the third robot 30, and the cameras 6a and 6b are mounted on the first and second robots 1 and 4, respectively.

Also in the robot systems according to the above-described modifications comprising three or more robots, wherein a camera is mounted on each of two or more robots, each camera can be calibrated in the same manner as in the foregoing embodiment. In the robot system shown in FIG. 4, for example, the cameras 6b and 6c are individually moved so that the pattern plate 3 comes within the respective ranges of the cameras 6b and 6c, and the calibration data for each camera is then obtained in the same manner as in the case of the foregoing embodiment by means of the visual sensor control device 20 of FIG. 1, on the basis of the video data obtained by photographing the pattern plate 3 by means of each camera. Thus, according to the present invention, the cameras can be flexibly calibrated depending on the robot system arrangement, even in the various robot systems comprising two or more cameras.

Although a camera is used as the visual sensor in the embodiment and modifications described herein, a laser measuring device may be used instead. In the above embodiment, moreover, the first calibration pattern data 12a is entered in the visual sensor control device 20 by means of the first robot control device 10. Alternatively, however, the data 12a may be manually inputted by means of the keyboard.

What is claimed is:

1. A calibration method for a visual sensor, comprising steps of:

(a) generating first calibration pattern data including coordinate values of a calibration jig, mounted on a first robot and formed of a pattern member, in a common coordinate system;

(b) generating second calibration pattern data including the coordinate values of the calibration jig in a visual sensor coordinate system, in accordance with visual information data for the calibration jig obtained by a visual sensor mounted on a second robot; and (c) calibrating the visual sensor by comparing the first calibration pattern data with the second calibration pattern data and calculating calibration data for associating the common coordinate system with the visual coordinate system.

2. A calibration method for a visual sensor according to claim 1, wherein said generating in step (a) includes the steps of:

(a1) detecting coordinate values of a distal end of an arm of the first robot in a robot coordinate system, (a2) obtaining the coordinate values of the calibration jig in the robot coordinate system based on the coordinate values of the distal end of the arm in the robot coordinate system and known data indicative of a mounting position and attitude of the calibration jig with respect to the arm, and (a3) obtaining the coordinate values of the calibration jig in the common coordinate system by transforming the coordinate values of the calibration jig in the robot coordinate system.

3. A calibration method for a visual sensor according to claim 1, wherein the calibration jig used in said generating in step (a) is formed of a pattern member having a dot pattern formed thereon.

4. A calibration method for a visual sensor according to claim 2, wherein known data indicative of respective formation positions of dots composing a dot pattern on a pattern member constituting the calibration jig, as well as the coordinate values of the distal end of the arm in the robot coordinate system and the known data indicative of the mounting position and attitude of the calibration jig with respect to the arm of the first robot, is used in said obtaining in step (a2), and coordinate values of the dots composing the dot pattern in the common coordinate system are obtained in step (a3).

5. A calibration method for a visual sensor according to claim 1, wherein the second calibration pattern data is generated by visually processing said visual information data in said step (b).

6. A calibration method for a visual sensor according to claim 1, wherein in said method further comprises the steps of:

(d) obtaining a distance of movement of the second robot from a position for execution of said calibrating from step (a) to step (c) to a new position reached after completing said calibrating in step (c), and (e) correcting the calibration data, calculated in step (c), using the distance of movement of the second robot.

7. A calibration method for a visual sensor according to claim 1, wherein said calibration method is applied to a robot system including a plurality of robots, the first robot fitted with the calibration jig being selected from among the plurality of robots and each of the plurality of robots remaining being fitted with a visual sensor, and wherein said generating and calibrating steps (a), (b) and (c) are executed for each of the plurality of robots.

8. A calibration method for a visual sensor according to claim 1, wherein at least one of a camera and a laser measuring device is used as the visual sensor in step (b).

* * * * *